Jan. 25, 1949.　　　B. B. GEMENY　　　2,460,003
ANTISKID DEVICE
Filed April 8, 1946
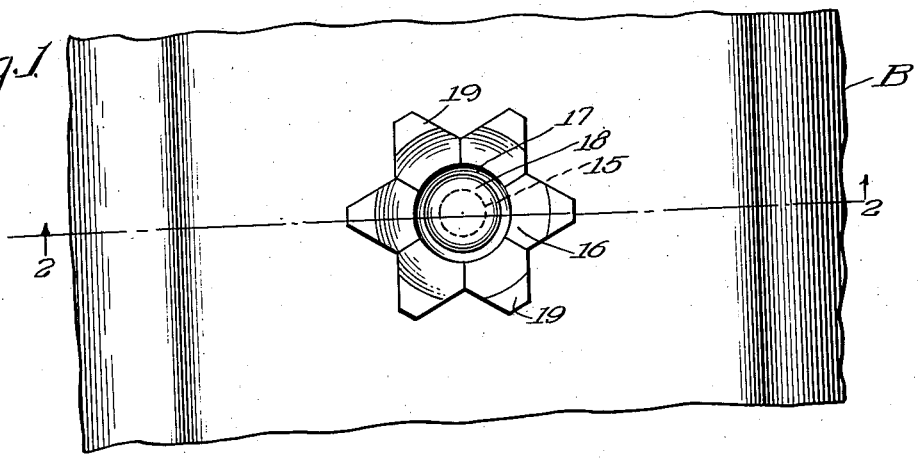
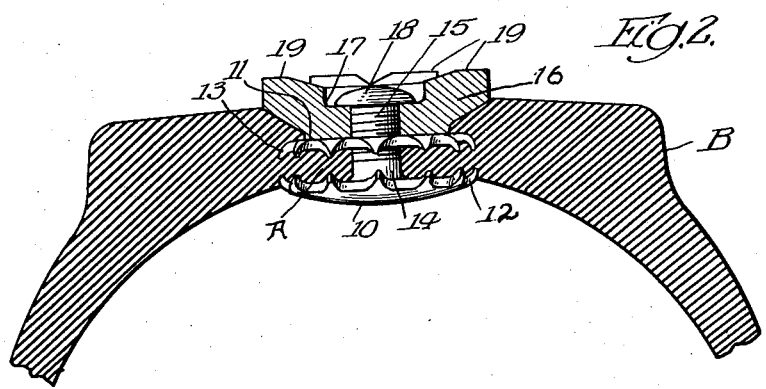
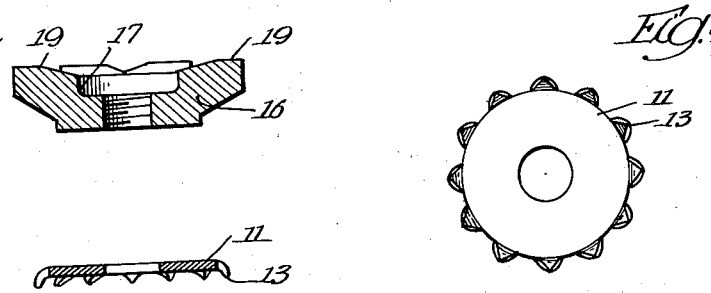
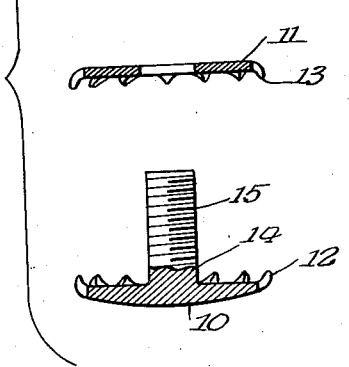
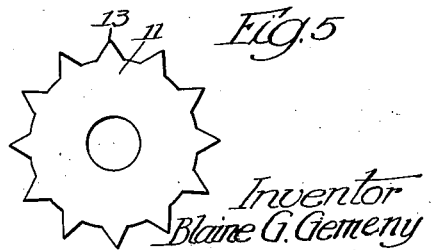
Inventor
Blaine G. Gemeny
By:— Fred Gerlach Atty.

Patented Jan. 25, 1949

2,460,003

UNITED STATES PATENT OFFICE 2,460,003

ANTISKID DEVICE

Blaine B. Gemeny, Chicago, Ill.

Application April 8, 1946, Serial No. 660,435

6 Claims. (Cl. 152—210)

The present invention relates to anti-skidding devices to be used in connection with tires, to prevent a dangerous amount of skidding of automobiles, trucks, bicycles and the like, upon pavements or streets which are slippery, or which are covered with ice, snow, water, oil or other matter, thereby preventing accidents which would otherwise result.

One object of the invention is to provide an improved device of this character which may be readily applied to the tread of a tire and is so designed and constructed that when it is in position the tractive force will be transferred directly to the tire casing to the end that all leverage action between the fastening means and the tire will be avoided.

Another object of the invention is to provide an improved device of this character in which the tractive force will be transferred as compression to the fastening means, and which compression force will be spread over an enlarged area, so as to reduce the unit shear or tearing action on the tire casing.

A further object is to provide an improved device of this character which may be readily applied to a tire, and which not only exerts a firm grip but also provides positive means for maintaining such firm grip.

A still further object of the invention is to provide an improved device of this character which is both simple, durable and strong in construction, and effective and efficient in operation.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawing exemplifying this invention.

Fig. 1 of the drawing is a top plan view of a portion of a tire, showing an anti-skid device constructed in accordance with the principles of this invention, applied thereto.

Fig. 2 is a transverse section on line 2—2 of Fig. 1.

Fig. 3 is an exploded view of the anti-skid device.

Fig. 4 is a bottom plan view of one of the clamping members.

Fig. 5 is a top plan view of the clamping member of Fig. 4.

The anti-skidding device constituting the present invention consists essentially of two co-operating clamping members 10—11, and these may be of any desired size and configuration but are preferably of disc-like formation. They are provided, respectively, with circumferential equidistantly spaced teeth 12—13. The teeth on one member are directed towards the teeth on the other member so that they may be embedded in a portion A of the tire B that is disposed between the clamping members.

The member 10 is located inwards of the member 11 and has an integral outwardly extending stem 14 which is preferably centrally disposed and is of suitable length. The diameter of the stem is considerably less than the diameter of its clamping member 10. The stem embodies an external screw thread 15 and passes outwards through a hole in the tire B and an opening in the central portion of the member 11. Such opening is of slightly greater diameter than the stem in order that the clamping member 11 is free to slide on the stem. As shown in Fig. 2, the member 11 is recessed into the tread of the tire B, and a nut 16 is mounted on the outer end of the stem. The inner portion of the nut is also recessed into the tire tread so as to engage the member 11 to the end that tightening or inward adjustment of the nut 16 upon the stem will force the two members 10 and 11 towards each other into clamping relation with the portion of the tire that is therebetween. The clamping member 10 is in effect a head and the clamping member 11 functions as a washer.

The nut 16 may be of any desired size, and is preferably provided with a centrally disposed recess 17 into which the outer extremity of the stem 14 projects. Such extremity of the stem is upset or beaded over, as at 18, in order to lock the nut 16 in place and also hold the members 10 and 11 against separation. Being recessed into the member 16, the upset or beaded over portion 18 of the stem will be maintained out of contact with the road bed. The outer face of the nut or member 16 is preferably shaped to form spaced apart, lug-type, road-engaging portions 19 which bite into the road bed for traction promoting purposes. These road-engaging portions may be arranged in any desired or suitable manner and are here shown as being substantially of the shape of the star. They project any desired or suitable distance beyond the tread of the tire in order that they grip the road bed when brought into contact therewith.

Any number of these devices may be employed and attached to the tire in any desired arrangement. For example, they may be arranged in a single or double line or they may be staggered.

With this improved construction, it will be manifest that there is provided a simple and efficient anti-skid device which may be readily applied and will be very effective. The device will not cut or damage the tire casing since the tractive force is exerted directly to the tire, and the objectionable leverage action heretofore present in devices of this character is eliminated. Furthermore, the casing fibers will be held in firm position within the outer circumference of the device and hence they cannot become deformed and cause a movement of the device within the tire structure.

The device is secured in position from the outside of the tire by tightening the nut 16 after first properly positioning the clamping members 10 and 11. After tightening of the nut the outer end of the stem 14 is upset or beaded over.

If desired, and after the device has been applied to the tire casing, the hole through which the stem 14 passes, as well as the surface of the tire surrounding the hole, may be provided with a coating of liquid gum, or other suitable substance, so that when the nut is tightened the assembly will provide a positive water and oil-tight construction.

In use, and if desired, spare tires which are equipped with the improved devices are mounted on wheels, and may be carried in a car or vehicle, so that they may be readily interchanged for the usual tire equipped traction wheels.

While the preferred form of the invention has been herein shown and described, it is to be understood that various changes may be made in the details of construction, in the combination and arrangement of the several parts, and in the shapes and configuration thereof, within the scope of the claims, without departing from the spirit of this invention.

What is claimed as new is:

1. An anti-skid device for tires, embodying two co-operating members for clamping a portion of a tire therebetween, means for holding said members in assembled relation and embodying a projection on one member and upon which the other member is adjustable, and a clamping member co-operating with said projection and operating to force said members into clamping relation, the end of said projection extending beyond said clamping member and being deformed in order to secure the members against separation, the deformed end of the projection being recessed into the said clamping member.

2. An anti-skid device designed for use with a tire and embodying a stem adapted to pass outwards through the tire, a head on the inner end of the stem of a diameter substantially larger than the diameter of the stem and adapted to engage the inner face of the tire, a washer on the central portion of the stem, said head and washer co-operating to clamp the tire therebetween, said washer being recessed into the tire, and a nut threaded on the outer end of the stem for causing a clamping relation between said head and washer, the extreme outer end of said stem being upset against the nut, the outer portion of the nut having pavement-engaging projections, said head and said washer being provided with peripheral teeth, the teeth on each projecting towards the teeth on the other.

3. An anti-skid device designed for use with a tire and embodying a stem adapted to pass outwards through the tire, a head on the inner end of the stem of a diameter substantially larger than the diameter of the stem and adapted to engage the inner face of the tire, a washer on the central portion of the stem, said head and washer co-operating to clamp the tire therebetween, said washer being recessed into the tire, and a nut threaded on the end of the stem for causing a clamping relation between said head and said washer, the extreme outer end of said stem being upset against the nut, the outer face of said nut being shaped to provide spaced, outwardly extending, lug-type projections adapted to engage the pavement and cut thereinto.

4. An anti-skid device designed for use with a tire and embodying a stem adapted to pass outwards through the tire, a head on the inner end of the stem of a diameter substantially larger than the diameter of the stem and adapted to engage the inner face of the tire, a washer on the central portion of the stem, said head and washer co-operating to clamp the tire therebetween, said washer being recessed into the tire, and a nut threaded on the outer end of the stem for causing a clamping relation between said head and said washer, the extreme outer end of said stem being upset against the nut, said nut having on its outer portion pavement-engaging projections disposed in a plane beyond the plane of the upset extreme outer end of said stem.

5. An anti-skid device for tires, said device embodying two co-operating members for clamping a portion of a tire therebetween, one of said members engaging the inner face of the tire, and the other being recessed into the tread of the tire from the periphery thereof, a stem on the innermost member extending through the other member, means engaging the stem for forcing the said members into clamping relation, means for maintaining the said members and the first said means in assembled relation, and pavement-engaging projections on the first said means, said projections being disposed in a plane beyond the second said means.

6. An anti-skid device for tires, said device embodying two co-operating members for clamping a portion of a tire therebetween, one of said members engaging the inner face of the tire, and the other being recessed into the tread of the tire from the periphery thereof, a stem on the innermost member extending through the other member, means engaging the stem for forcing the said members into clamping relation, the end of said stem being upset to maintain the parts in assembled relation, and pavement-engaging projections on the first said means, projecting beyond the said upset end of said stem.

BLAINE B. GEMENY.

REFERENCES CITED

The following references are of record in the file of this patent:

UNITED STATES PATENTS

| Number | Name | Date |
|---|---|---|
| 1,096,535 | Howard | May 12, 1914 |
| 1,143,141 | Rood | June 15, 1915 |

FOREIGN PATENTS

| Number | Country | Date |
|---|---|---|
| 351,102 | France | July 4, 1905 |